United States Patent
Pakki et al.

(10) Patent No.: US 12,155,579 B1
(45) Date of Patent: Nov. 26, 2024

(54) SYSTEMS AND METHODS TO INTERJECT STORED DOWNLINK MESSAGES OVER NON-STORED ACARS OVER INTERNET PROTOCOL DOWNLINK MESSAGES

(71) Applicant: Honeywell International Inc., Charlotte, NC (US)

(72) Inventors: Sathish Pakki, Phoenix, AZ (US); Thomas D. Judd, Phoenix, AZ (US)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 18/493,062

(22) Filed: Oct. 24, 2023

(30) Foreign Application Priority Data

Jun. 26, 2023 (IN) .............................. 202311042691

(51) Int. Cl.
*G06F 13/00* (2006.01)
*H04L 5/00* (2006.01)
*H04L 12/66* (2006.01)
*H04L 47/72* (2022.01)
*H04L 47/74* (2022.01)

(52) U.S. Cl.
CPC ............ *H04L 47/72* (2013.01); *H04L 5/0048* (2013.01); *H04L 5/0055* (2013.01); *H04L 12/66* (2013.01); *H04L 47/741* (2013.01)

(58) Field of Classification Search
CPC ..... H04L 47/72; H04L 5/0048; H04L 5/0055; H04L 12/66; H04L 47/741
USPC ........................................ 709/224, 223, 203
See application file for complete search history.

(56) References Cited

U.S. PATENT DOCUMENTS

| | | | |
|---|---|---|---|
| 8,285,865 B2* | 10/2012 | Gruyer ................ | H04L 12/4633 709/228 |
| 10,425,149 B1 | 9/2019 | Judd et al. | |
| 10,798,033 B2 | 10/2020 | Judd et al. | |
| 10,972,175 B2 | 4/2021 | Zeng et al. | |
| 2011/0047281 A1* | 2/2011 | Gruyer ................ | H04B 7/18506 709/230 |
| 2020/0152070 A1 | 5/2020 | Fraser et al. | |
| 2024/0204964 A1* | 6/2024 | Judd ..................... | H04W 72/21 |

* cited by examiner

*Primary Examiner* — Kenneth R Coulter
(74) *Attorney, Agent, or Firm* — Fogg & Powers LLC

(57) ABSTRACT

A communications management system and an AoIP gateway server are disclosed. The AoIP gateway server is configured to send a first ACARS downlink message via an AoIP communication link. While the first ACARS downlink message is pending transmission, the communications management system is configured to send one or more ACARS downlink messages of a store and forward message type to the AoIP gateway server. The AoIP gateway server is configured to store each of the ACARS downlink messages while the first ACARS downlink message is pending transmission, and, for each store and forward message, send a pseudo-acknowledgment response back to the communications management system that indicates that the store and forward message was successfully transmitted to at least one ground system.

20 Claims, 5 Drawing Sheets

SYSTEMS AND METHODS TO INTERJECT STORED DOWNLINK MESSAGES OVER NON-STORED ACARS OVER INTERNET PROTOCOL DOWNLINK MESSAGES

CROSS-REFERENCE TO RELATED APPLICATIONS

This application claims benefit of Indian Provisional Application No. 20/231,1042691, filed on Jun. 26, 2023, and titled "SYSTEMS AND METHODS TO INTERJECT STORED DOWNLINK MESSAGES OVER NON-STORED ACARS OVER INTERNET PROTOCOL DOWNLINK MESSAGES," the contents of which are hereby incorporated in their entirety.

BACKGROUND

Many aerial vehicles such as commercial aircraft rely on Aircraft Communications Addressing and Reporting System (ACARS) communications to communicate with ground systems during navigation. For example, aircraft may communicate with multiple air traffic control (ATC) centers and Airline Operations Control (AOC) centers during the course of navigation (e.g., while at the gate during takeoff, enroute, landing, etc.). ACARS is typically implemented using a datalink messaging format sent over one of many types of wireless communication links. Traditional ACARS communication links include VHF, HF, and traditional SATCOM, which are approved for safety as well as operational data communications. A more recent ACARS communication link has emerged, referred to as ACARS over Internet Protocol (AoIP) communication link, which provides the capability to send and receive ACARS messages via non-traditional broadband IP links like WiFi, Cell, and Broadband/Cabin SATCOM.

To facilitate downlink and uplink ACARS datalink messages, avionics devices (onboard or offboard systems configured for datalink message processing) generate and send the message to a communications management unit (CMU) on the aerial vehicle. The CMU will process the downlink message and ultimately sends the downlink message to the intended ground systems. For downlink messages suitable for AoIP, the CMU sends the downlink message to an AoIP gateway server that sends the downlink message via an AoIP communication link to the intended ground systems when such a link is available. In the uplink direction, the CMU or the AoIP gateway server receives an uplink message from the ground system and forwards it to the intended avionics devices.

A conventional CMU sends only one downlink message at a time and will not send another queued message or accept another message from an avionics device unless it receives confirmation that the ground station received the previous message. Although avionics devices may need to send multiple messages in a short timeframe, in a conventional ACARS processing system, messages queued in the CMU or avionics devices must continue to wait until a previous message has been successfully transmitted to the ground system. This may cause a noticeable delay in message processing, especially for large messages and/or low available bandwidth for the communication links. It could even prevent higher priority messages from being sent while waiting on lower priority messages that are still pending transmission.

Therefore, a need exists to expedite downlink AoIP message processing between an aerial vehicle and a ground system.

SUMMARY

The details of one or more embodiments are set forth in the summary and description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a method for processing downlink ACARS messages between a communications management system coupled to a vehicle and an ACARS over Internet Protocol (AoIP) gateway server is disclosed. The method comprises receiving or generating, at the communications management system, a first ACARS downlink message. The method comprises forwarding the first ACARS downlink message to a ground system communicatively coupled to the vehicle. The first ACARS downlink message is forwarded via an AoIP communication link. The method comprises receiving, at the communications management system, a second ACARS downlink message. The second ACARS downlink message is configured for storage in a database of the AoIP gateway server. The method comprises sending the second ACARS downlink message to the AoIP gateway server before receiving an indication from the ground system that the first ACARS downlink message has been successfully received.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as briefly described below and as described further in conjunction with the detailed description.

Figure 1:
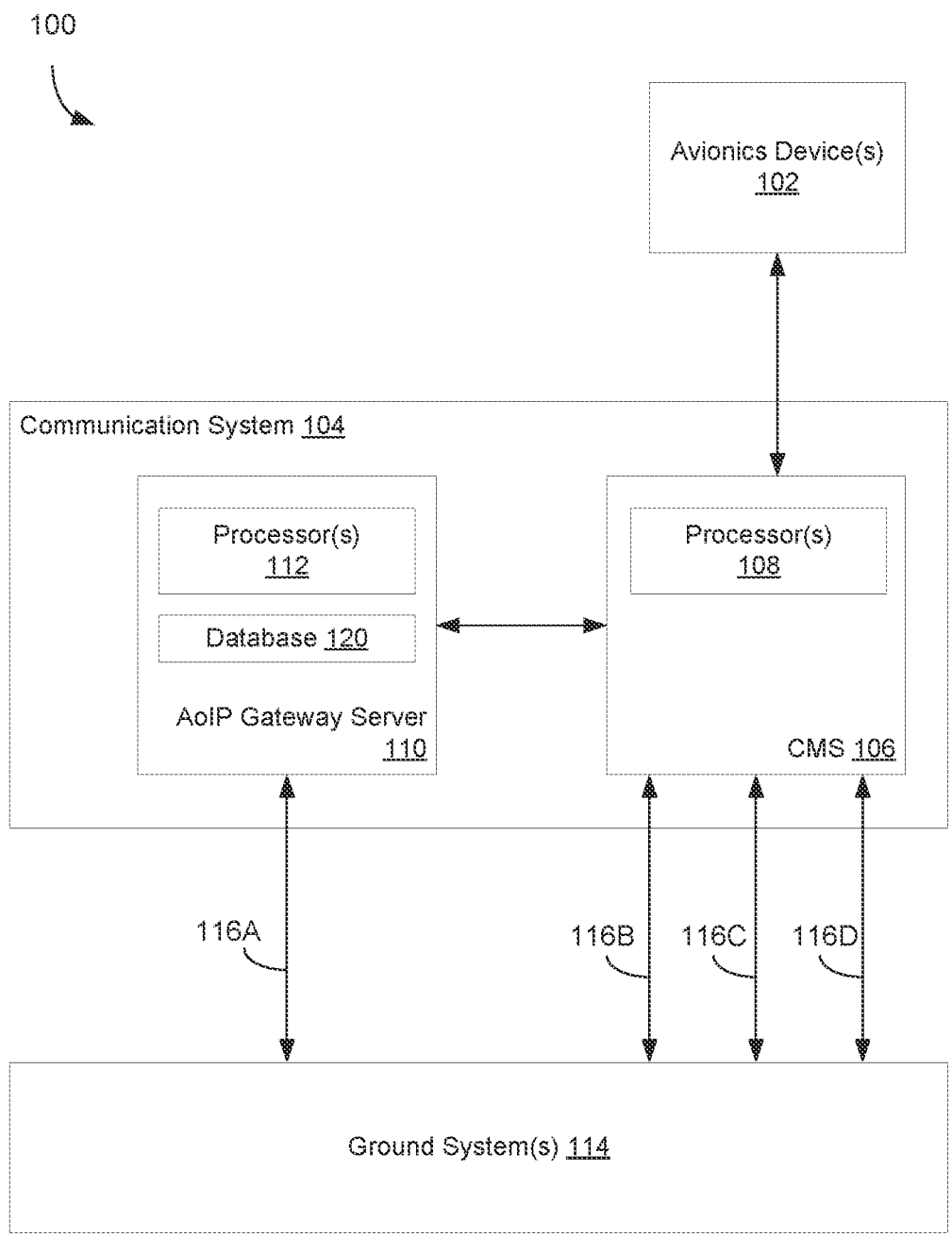
FIG. 1 depicts an exemplary system that processes ACARS messages to and from at least one ground system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 depicts a block diagram of a system, indicated generally at 100, configured to process ACARS messages on an aerial vehicle. Use of the term "aerial vehicle" is not intended to be limiting and includes all classes of vehicles falling within the ordinary meaning of the term. This includes but is not limited to, commercial, non-commercial, or recreational aircraft, urban air mobility vehicles, and other vehicles. Throughout the disclosure, the aerial vehicle may be further illustrated as an aircraft with the understanding that the principles described herein apply to other aerial vehicles where applicable.

The system 100 includes at least one avionics device 102 coupled to a communications system 104. Avionics device 102 can be an onboard avionics device that is affixed to (for example, mounted on) the interior of the vehicle, such as the cockpit. Alternatively, avionics device 102 is an offboard avionics device that is portable and can be taken off the vehicle. Examples of onboard and offboard avionics devices include a navigational display device, a primary flight display, FMS (Flight management System, a maintenance system, a Cabin terminal, an electronic flight bag (EFB), or a tablet, smartphone or other portable electronic device (PED) that is configured for running one or more avionics applications with a display or interface. In some embodiments, the avionics device 102 includes at least one human-machine interface (HMI) that is configured to display and visualize data to the vehicle personnel (for example, operator and flight crew), and also enables the personnel to input or select data. For example, the HMI includes or is coupled to any kind of input device (computer mouse, buttons, switches, and the like). In some examples, the HMI includes a screen with touchscreen functionality or cursor selection capability so that the vehicle personnel can input data directly on the screen. Examples of the HMI that can be implemented on an avionics device include a Multi-Display Control Display Unit (MCDU) and a Multi-Function Display Unit. In addition to an HMI, the avionics device 102 can include at least one processor and a memory. In some examples, the memory stores an avionics application that enables the avionics device 102 to communicate and receive ACARS messages. Additionally, or alternatively, the avionics device 102 includes suitable circuitry that is configured for performing the functionality of the avionics device.

Avionics device 102 is coupled to a communications management system (CMS) 106, e.g., either through a wired connection or wireless connection. Although a single avionics device 102 is shown in FIG. 1, CMS 106 can be coupled to multiple avionics devices 102 through separate connection links. Optionally, each avionics device 102 registers with the CMS 106 before the avionics device 102 receives or transmits data to the CMS 106. In some embodiments, the CMS 106 is or includes a communications management unit (CMU) or a communications management function (CMF) executed by one or more processors (e.g., processor 108).

CMS 106 is generally configured for managing the flux of ACARS messages that are exchanged between the aerial vehicle and the ground system 114. In the downlink direction, CMS 106 receives an ACARS message from avionics device 102. In response to receiving the message, CMS 106 processes the ACARS message and determines whether the ACARS message should be sent to the ground system 114. In some embodiments, CMS 106 reviews the ACARS message before it is sent to the ground system 114. If there are any errors or anomalies in the ACARS message, CMS 106 can send an alert to the avionics device 102 and may discard the ACARS message. In some embodiments, CMS 106 processes a downlink ACARS message based on message type, which include a maintenance message, Cabin Terminal message, EFB message, condition monitoring message, AOC message, and others, as indicated by inspecting the ACARS address of the downlink message. Each of these messages can be associated with a "normal" ACARS message or a "store and forward" message that can be stored by the AoIP gateway server 110.

When CMS 106 determines that an ACARS message from avionics device 102 is ready to be transmitted, it can send the ACARS message to ground system 114 through an available communication link (based on subnetwork preference associated with that message type). As shown in FIG. 1, CMS 106 is communicatively coupled to ground system 114 through three exemplary communication links 116B, 116C, 116D. Each communication link 116B-116D can correspond to a particular type of radio frequency (RF) communications, including high frequency (HF), very high frequency (VHF), satellite communications (SATCOM), and the like. CMS 106 sends the ACARS message over one of the communication links 116B-116D based on the message type and link availability to the ground system 114. As current industry standards require certain types of messages to be transmitted over these communication links, CMS 106 may prioritize transmitting higher priority ACARS messages through one of these communication links 116B-116D when available.

The ground system 114 responds by sending an acknowledgment (ACK) message back to CMS 106, which confirms to the CMS 106 that the ACARS message was successfully transmitted. The ACK message from the ground system 114 completes the downlink ACARS message transmission process.

CMS 106 is communicatively coupled to an AoIP gateway server 110. As shown in FIG. 1, in some embodiments the AoIP gateway server 110 is part of communication system 104 as part of the vehicle, but in other embodiments, can be remotely coupled to CMS 106 and implemented via a remote server. The AoIP gateway server 110 is configured to implement an AoIP function that configures the AoIP gateway server 110 to send certain types of messages via an AoIP communication link 116A to the ground system 114. The AoIP gateway server 110 is implemented with one or more processors 112 configured to execute the functions of AoIP message processing. Processor 112, or any of the processing systems described herein, may include any one or combination of processors, microprocessors, digital signal processors, application specific integrated circuits, field programmable gate arrays, and/or other similar variants thereof. Any processing systems may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures.

For certain types of messages, such as messages that are low-priority ("forward") or messages marked with a "store"

indicator, CMS 106 can send the message directly to ground system 114 via one of the communication links 116B-116D, or, in some embodiments, forwards the ACARS message suitable for AoIP to the AoIP gateway server 110. In response, the AoIP gateway server 110 processes the ACARS message. If the AoIP communication link 116A is available to ground system 114, then the AoIP gateway server 110 sends the ACARS message over the AoIP communication link 116A. If the AoIP communication link 116A is unavailable and/or there are queued messages to be sent via the AoIP communication link 116A, then the AoIP gateway server 110 is configured to store the ACARS message in the database 120. Messages can be stored in database 120 based on an order of priority. Thus, in some embodiments, the ACARS message that is currently received by the AoIP gateway server 110 from CMS 106 may be lower in priority than an ACARS message that is already stored in database 120. In this case, the AoIP gateway server 110 stores the currently received ACARS message having lower priority in the database 120 and retrieves the higher priority message stored in database 120 when the communication link 116A is available.

If a message intended to be transmitted over AoIP communication link 116A fails, then the message can be reattempted over AoIP communication link 116A or can be subsequently stored by the AoIP gateway server 110 and transmitted once a communication link 116A is available. A message can be sent from the AoIP gateway server 110 to the CMS 106 indicating that attempted transmission of the non-store and forward message has failed.

An ACARS message may take a period of time before it is received and acknowledged by ground system 114. In that time period, the CMS 106 may receive multiple messages from multiple avionics devices 102 and may not be able to process and send each ACARS message immediately to the ground system 114 because (1) the type of message may be only suited for a type of communication link that is currently unavailable; (2) the preferred communication link is available but the message cannot be transmitted over the preferred communication link (e.g., because another downlink message is pending acknowledgment); and/or (3) each of the communication links configured for transmitting messages to the ground system 114 may be unavailable. Typically, a CMS 106 can only send one downlink message at a time and cannot begin processing on another downlink message in its queue unless and until it receives an ACK message that the previous message was successfully received. Even then, a CMS 106 may wait until the highest preferred communication link is available to send a queued downlink message.

In some embodiments, the AoIP gateway server 110 is configured to send a "pseudo-ACK" message to CMS 106 in response to receiving an ACARS message of a store and forward message type. The response message is a "pseudo-ACK" message because it signals to the CMS 106 that the ACARS message sent to the AoIP gateway server 110 was received by the ground system 114 regardless of whether the message was actually received by the ground system 114. For example, the AoIP gateway server 110 may send a store and forward ACARS message over the AoIP communication link 116A to ground system 114, and immediately receives an ACK message from ground system 114. Alternatively, the AoIP gateway server 110 may store an ACARS message in database 120. When the AoIP gateway server 110 receives a store and forward type message, it is configured to automatically send an ACK message (the pseudo-ACK) in response to receiving a store and forward ACARS message by CMS 106. Doing so generally improves downlink processing by enabling the CMU to continue processing messages even though there has not been an ACK message from ground system 114.

In some situations, however, a previous AoIP message may be initially transmitted using communication link 116A and is awaiting acknowledgment by ground system 114. In high traffic or low bandwidth environments, the acknowledgment may not be received for some time. During that time, CMS 106 would conventionally halt further message processing until it receives some kind of ACK message.

To further improve the efficiency of ACARS downlink message processing, CMS 106 is configured to automatically send all store and forward AoIP suitable ACARS messages in its messaging queue to the AoIP gateway server 110, even when another ACARS message is currently being transmitted to the ground system 114 via AoIP. In some embodiments, after a first ACARS message is being sent to ground system 114, the AoIP gateway server 110 is configured to automatically send a pseudo-ACK message back to the CMS 106. For any queued downlink messages from avionics devices 102 or CMS 106 that are store and forward type messages suitable for AoIP transmission, CMS 106 is configured to send the store and forward type message to the AoIP gateway server 110. In response, the AoIP gateway server 110 is configured to store the store and forward type message in database 120 and automatically send a pseudo-ACK message back to CMS 106 indicating that the message has been received by ground system 114. CMS 106 can then continue to send any store and forward messages to the AoIP gateway server 110 even while another ACARS downlink message is pending transmission to ground system 114. AoIP gateway server 110 stores the store and forward type message in database 120 until an available downlink communication link can be established with the ground system 114.

In one exemplary embodiment, CMS 106 determines that a first ACARS downlink message is suitable for transmission via AoIP, and sends the first ACARS downlink message to the AoIP gateway server 110. The AoIP gateway server 110 sends the first ACARS downlink message to ground system 114 over AoIP communication link 116A. In this example, the first ACARS message either is highest in priority over the currently stored ACARS messages or is the first ACARS message received by the AoIP gateway server 110. While awaiting the ACK response on the first ACARS downlink message, the AoIP gateway server 110 sends a pseudo-ACK response to CMS 106 indicating that the first ACARS downlink message was successfully transmitted to the ground system 114 (even though the first ACARS message is actually in progress). CMS 106 then sends each additional store and forward message in its queue to the AoIP gateway server 110, and the AoIP gateway server 110 stores each store and forward message in database 120 and responsively sends pseudo-ACK messages for each message received from the CMS 106. As a result, all store and forward messages can be relayed to the AoIP gateway server 110 during transmission of the first ACARS downlink message, instead of remaining queued for processing by CMU 106. In doing so, downlink messages can be processed more efficiently between the AoIP gateway server 110, CMS 106, and the avionics devices 102. Specifically, the avionics devices 102 are able to send additional ACARS messages to the CMS 106 rather than waiting until a previous store and forward message is sent and acknowledged by the ground system. The AoIP gateway server 110 and/or CMS 106 eventually receives the ACK response from ground system 114 once the first ACARS downlink message is successfully transmitted, which enables the CMS 106 and/or the AoIP gateway server 110 to resume sending queued ACARS messages to the ground system.

In some examples, the processing of ACARS downlink messages is done sequentially. In the example above, the CMS 106 has a plurality of ACARS messages queued that are of a store and forward type. The CMS 106 sends one of the queued ACARS messages to the AoIP gateway server 110, which responds by sending a pseudo-ACK back to the CMS. Upon receiving the pseudo-ACK, the CMS 106 then sends another of the queued ACARS messages to the AoIP gateway server 110, which again responds with a pseudo-ACK. This process can be repeated for each of the plurality of ACARS messages that are of a store and forward type, even when another message (not part of the queued plurality of ACARS messages) is currently being transmitted to the ground system 114 via AoIP communication link 116A.

By configuring the CMS 106 to send queued store and forward messages to the AoIP gateway server 110 even during transmission of an earlier downlink message and, in some embodiments, even in the absence of a pseudo-ACK from the AoIP gateway server 110, downlink messages can be processed more efficiently than by waiting for each ACK message to initiate store and forward message processing. Specifically, the CMS 106 needs to process less messages from avionics devices 102 in the downtime when a previous ACARS message is still being transmitted, and the AoIP gateway server 110 can temporarily store and forward messages until convenient to do so. As a result, downlink ACARS message processing can be implemented with less backlogging between the CMS 106 and the avionics devices 102, each of which may need to send multiple downlink messages of varying priorities (but can only send one message at a time to the CMS 106).

Figure 2:
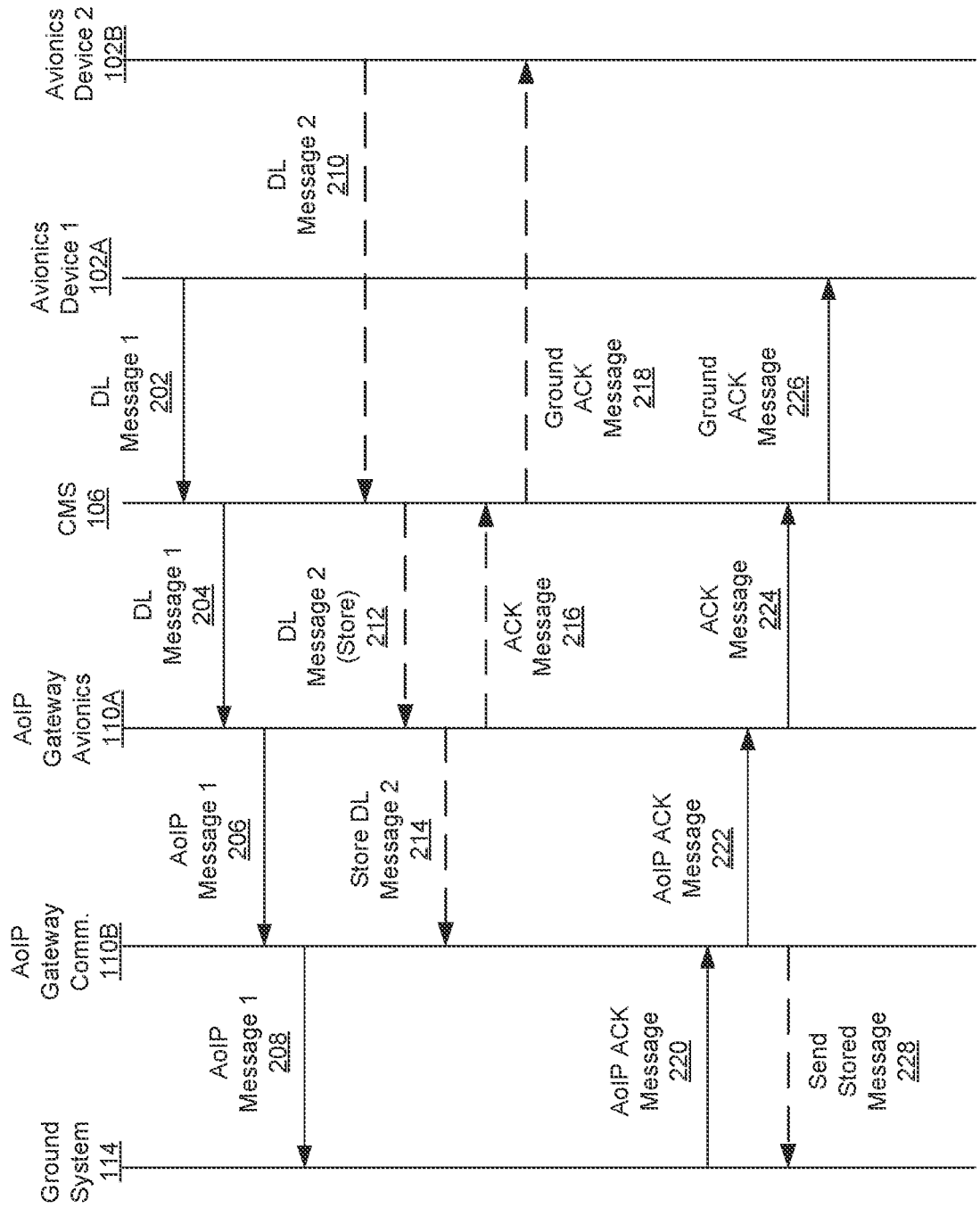
FIG. 2 depicts a message flow diagram that illustrates a message flow sequence between avionics devices, a communication management system, and an AoIP gateway server.

FIG. 2 depicts a message flow diagram that illustrates an exemplary message flow sequence between avionics devices, a communication management system, and an AoIP gateway server. Each different entity is represented as a vertical line in the diagram, with the different entities shown as a first avionics device 102A, a second avionics device 102B, CMS 106, the AoIP gateway avionics entity 110A, AoIP gateway communication entity 110B, and ground system 114. Unless otherwise specified, messages that are shown in FIG. 2 as being higher relative to other messages are messages that are transmitted before a lower message. Messages are shown as solid or dotted lines, and messages that are transmitted to a particular entity are shown in FIG. 2 as an arrow to that entity. Messages that pass through a particular entity in FIG. 2 are not necessarily indicative of a message being transmitted to that entity. The message flow diagram shown in FIG. 2 serves as an exemplary embodiment for the downlink processing of ACARS messages. In other examples, the CMS 106 can be configured to send and receive AoIP messages.

The message sequence begins when avionics device 102A transmits an ACARS downlink message 202 to CMS 106. CMS 106 processes the ACARS downlink message 202 and transmits an ACARS downlink message 204 to the AoIP gateway avionics entity 110A (part of the AoIP gateway server 110) because AoIP is the highest preferred, available subnetwork for this type of downlink message. The AoIP gateway avionics entity 110A processes the downlink message 204 and converts the data in the downlink message to an AoIP format. The AoIP gateway avionics 110A sends an AoIP message 206 to the AoIP gateway communications entity 110B (part of AoIP gateway server 110). The AoIP gateway communications entity 110B then transmits an AoIP message 208 to ground system 114.

At this point, the AoIP gateway server 110 and CMS 106 are awaiting an ACK response from ground system 114 for the ACARS downlink message originated from avionics device 102A and transmitted by the AoIP gateway server 110. As shown in FIG. 2, at this point, no ACK message (either an actual ACK from ground system 114 or a pseudo-ACK from the AoIP gateway entities 110A-110B) has been sent to CMS 106. After the AoIP gateway communications entity 110B transmits the first ACARS downlink message to ground system 114, but before an ACK message is received, avionics device 102B sends an ACARS downlink message 210 to CMS 106 (or could be already queued up in the queue). CMS 106 determines, based on the type of message, that the ACARS downlink message is a message that can be stored on the AoIP gateway server 110. For example, in one embodiment, CMS 106 reviews the label/sublabel or label of the ACARS downlink message to determine whether the message is a store and forward message suitable for processing by the AoIP gateway server 110. Once CMS 106 determines that the ACARS downlink message 210 is of a store and forward message type, it sends a store and forward message 212 to the AoIP gateway avionics 110A without waiting for an ACK message for the previous ACARS message. The AoIP gateway avionics entity 110A then determines that the message can be stored, and sends a message 214 to the AoIP gateway communications entity 110B to store the message. The AoIP gateway avionics entity 110A then generates a pseudo-ACK message 216 for the second ACARS message (since it is still in progress for sending to ground system 114) to CMS 106. Believing the pseudo-ACK message 216 to be a true ACK from ground system 114 for the second ACARS message, CMS 106 sends an indication message 218 to avionics device 102B that the message has been delivered. This enables the avionics device 102B to send an additional message to the CMS 106.

Although not explicitly shown in FIG. 2, the above process of sending store and forward messages to the AoIP gateway server 110 can be repeated for each store and forward downlink message received at CMS 106 from avionics devices 102A, 102B.

As the AoIP gateway server 110 and the CMS 106 are still awaiting an ACK response from the first ACARS downlink message, the AoIP gateway communications entity 110B stores the second ACARS downlink message instead of immediately sending it ground system 114 and sends a corresponding pseudo-ACK back to the CMS. At a subsequent time, the AoIP gateway communications entity 110B receives an AoIP ACK message 220 or some kind of indication the AoIP message was delivered for the first ACARS downlink message from ground system 114. In response, the AoIP gateway communications entity 110B sends an AoIP ACK (or pseudo ACK) message 222 to the AoIP gateway avionics entity 110A. Afterwards, or simultaneously while sending the AoIP ACK message 222, the AoIP gateway communications entity 110B retrieves one of the stored messages and sends the stored message 228 to ground system 114 via AoIP communications link 116A. The stored message can be the second ACARS downlink message originating from avionics device 102B, or, if a higher priority message is previously stored in the database 120, the AoIP gateway communications entity 110B can send that message instead. After assurance the previous message had been received on the ground, the AoIP gateway communications entity 110B can continue to send stored messages 228 to ground system 114 for additional messages stored in the database 120 while there is sufficient bandwidth to utilize the AoIP communications link 116A.

Once the AoIP gateway avionics entity 110A receives the AoIP ACK message 222, it sends an ACK message 224 to CMS 106. CMS 106 then sends an ACK message 226 to avionics device 102A indicating that the first ACARS downlink message has been successfully received by ground system 114.

Figure 3:
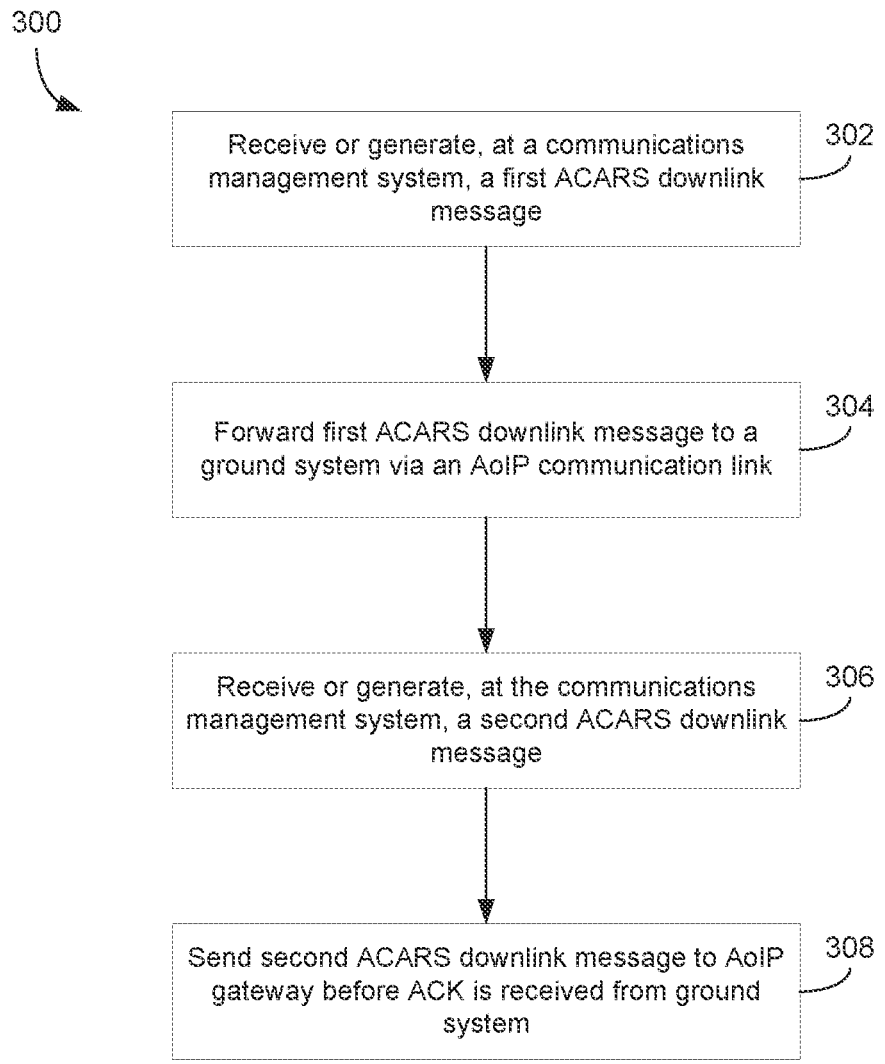
FIG. 3 depicts a flow diagram of an exemplary method for processing ACARS downlink messages between a communications management system and an AoIP gateway server.

FIG. 3 depicts a flow diagram of an exemplary method 300 for processing ACARS downlink messages between a communications management system and an AoIP gateway server. Method 300 may be implemented via the techniques described with respect to FIGS. 1-2, but may be implemented via other techniques as well. The blocks of the flow diagram have been arranged in a generally sequential manner for case of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 300 includes receiving or generating, at a communications management system (CMS), a first ACARS downlink message at block 302. For example, the first ACARS downlink message can be sent from one of a plurality of avionics devices that are communicatively coupled to the CMS. ACARS messages may have different priorities and some ACARS messages may be suitable for AoIP processing.

Method 300 proceeds to block 304 and forwards the first ACARS downlink message to a ground system via an AoIP communication link. In this step, for example, the CMS processes the first ACARS downlink message and forwards the first ACARS downlink message to the AoIP gateway server, which then processes and sends the first ACARS downlink message to the ground system. In some examples, this is done by sending the ACARS downlink message to a datalink service provider, which may process the downlink message and forward the message to the intended ground system entities.

Method 300 then proceeds to block 306 and receives or generates, at the CMS, a second ACARS downlink message. The second ACARS downlink message may originate from the same avionics device that generated the first ACARS downlink message, or may originate from another avionics device that is coupled to the CMS (or may originate from the CMS itself). If the second ACARS downlink message is a store and forward message (based on the label/sublabel or label that is present in the second ACARS downlink message), it is configured for storage by the AoIP gateway server. In some embodiments, the second ACARS downlink message is a store and forward message having a lower priority than other ACARS downlink messages, which may correspond to information such as maintenance data for the avionics device that transmitted the second ACARS downlink message.

Method 300 then proceeds to block 308 and sends the second ACARS downlink message to the AoIP gateway server. The CMS can be configured to do so even though it has not received an ACK message for the first ACARS downlink message, such as from either the ground system via the AoIP gateway server, or the AoIP gateway server itself. The first ACARS downlink message may still be pending transmission to the ground system, and hence the ground system may not have received the first ACARS downlink message yet or the acknowledgement may not have been received yet. For any other store and forward messages that the CMS receives while the first ACARS downlink message is pending transmission, the CMS automatically forwards these messages to the AoIP gateway server independent of any ACK messages that is received for the first ACARS downlink message. In response, the AoIP gateway server sends a pseudo-ACK message back to the CMS for each store and forward message.

Figure 4:
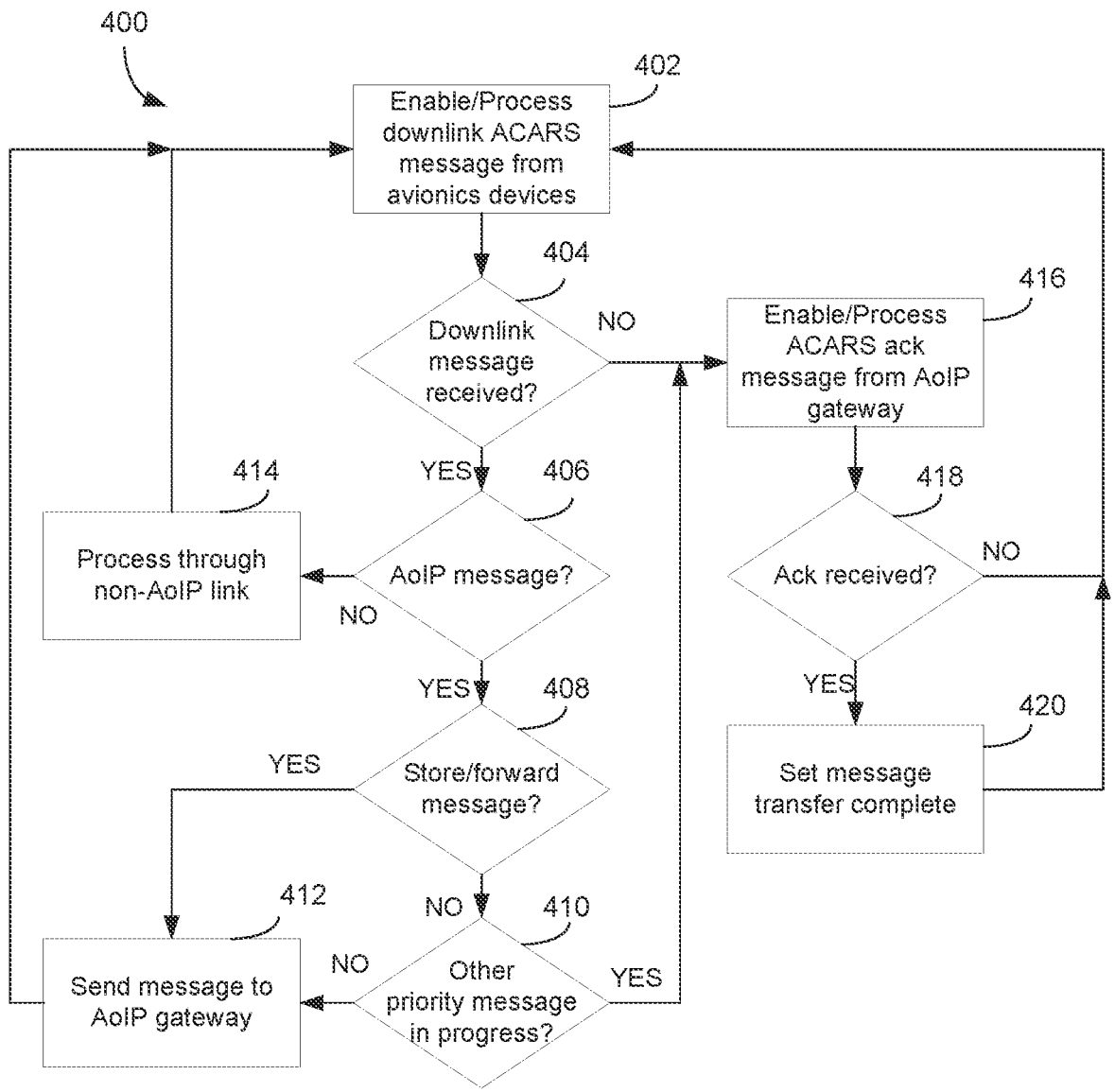
FIG. 4 depicts a flow diagram of an exemplary method for processing ACARS downlink messages at a communications management system.

FIG. 4 depicts a flow diagram of an exemplary method for processing ACARS downlink messages at a communications management system. Method 400 provides one exemplary method that can be performed in conjunction with the processing of method 300, and utilizing the description of FIGS. 1-2. For example, method 400 can be performed by the CMS 106.

Method 400 includes enabling or processing downlink ACARS messages from avionics devices at block 402. If no downlink message is pending transmission to a ground system, then the CMS 106 can continue to process or forward downlink messages as they are received from the avionics devices. Proceeding to block 404, method 400 evaluates whether a new downlink message has been received. If not, then method 400 proceeds to block 416 as subsequently described. If the CMS 106 receives a downlink message, then method 400 proceeds to block 406 and evaluates whether the downlink message is suitable for AoIP processing. In some examples, determining that the message is suitable for AoIP processing includes determining that the message indicates that AoIP is the highest preferred, available subnetwork to transmit. A message can be suitable for more than one type of subnetwork processing. However, some messages may not be suitable for AoIP processing, such as messages with higher priority for other subnetworks, large messages, messages excluded by the operator for AoIP transmission, or messages that must be communicated over particular communication links as regulated by industry standards (e.g., safety messages). If the downlink message is not an AoIP message, then method 400 proceeds to block 414 and processes the downlink message and sends the downlink message via a non-AoIP communication link, such as HF, VHF, or SATCOM, to the ground system.

For a message determined to be an AoIP message, method 400 determines whether the AoIP message is a store and forward type message at block 408. Store and forward messages are messages that are configurable to be stored, for example, in the database 120 managed by the AoIP gateway server 110. While store and forward messages are suitable for AoIP processing, other messages that can be transmitted over non-AoIP can also be processed by the AoIP gateway server in some circumstances. Such messages include other AoIP suitable messages that are not meant to be immediately stored on the AoIP gateway server 110 but instead are intended to be transmitted to a ground system via AoIP. In one embodiment, if the AoIP message is a store and forward message, then method 400 proceeds to block 412 and sends the message to the AoIP gateway server to be stored. In some embodiments, the store and forward message is automatically sent to the AoIP gateway server even though there is another higher priority message in progress (that is, it is sent independently of whether a previously transmitted message is in progress). Doing so enables store and forward messages to be quickly processed by the CMS and cleared of its queue while another message is pending transmission. Subsequently, method 400 reverts back to block 402 and enables downlink processing on other ACARS downlink messages received from the avionics devices.

Alternatively, proceeding to block 410, method 400 determines whether there is another priority message in progress when the AoIP message is not a store and forward type message. If there is no priority message pending transmission to the ground system, then method 400 proceeds to block 412 and sends the message to the AoIP gateway server 110 for transmission via AoIP. If there is a priority message in progress, then method 400 proceeds from block 410 to block 416 and enables or processes an ACK message received from the AoIP gateway server. At block 418, method 400 determines whether an ACK message has been received for an ACARS message that was previously sent by the CMS (e.g., either to AoIP gateway server 110 or to ground system 114). If not, method 400 reverts to block 402 and continues processing ACARS downlink messages. If an ACK has been received, then method 400 proceeds to block 420 and sets the message transfer complete for the ACARS message that corresponds to the received ACK message. The method 400 then reverts to block 402 and continues processing ACARS downlink messages.

Figure 5:
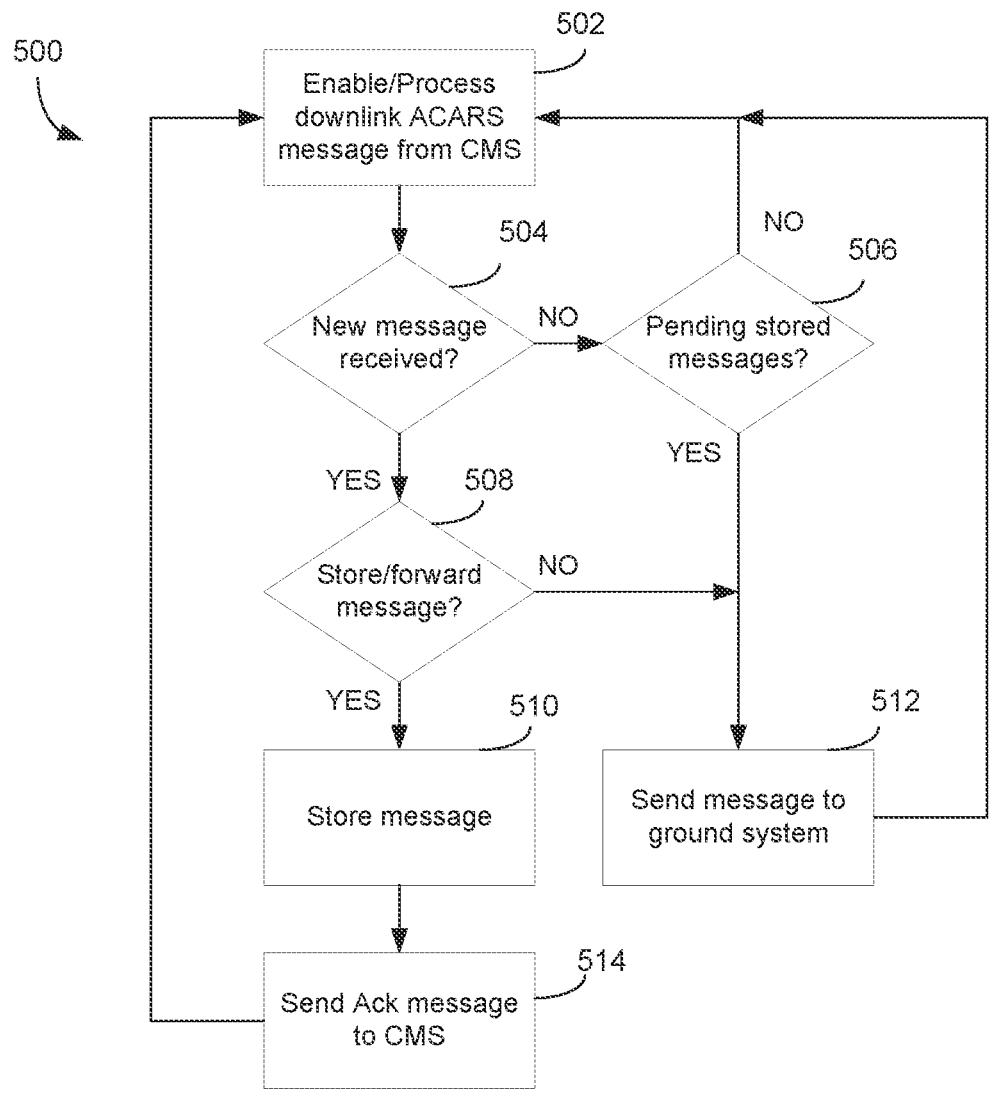
FIG. 5 depicts a flow diagram of an exemplary method for processing ACARS downlink messages at an AoIP gateway server.

FIG. 5 depicts a flow diagram of an exemplary method for processing ACARS downlink messages at an AoIP gateway server. Method 500 provides one exemplary method that can be performed in conjunction with the processing of methods 300-400, and utilizing the description of FIGS. 1-2. For example, method 500 can be performed by the AoIP gateway server 110.

Method 500 includes enabling or processing a downlink ACARS message from the CMS at block 502. An ACARS downlink message that is received from the CMS will be suitable for AoIP processing. Proceeding to block 502, method 500 determines whether a new ACARS message has been received. If no new message has been received, then method 500 proceeds to block 506 and determines whether there are any pending stored messages. If there are no pending stored messages to be sent, then method 500 reverts back to block 502 and monitors for additional ACARS messages received from the CMS. If there are pending stored messages to be sent at block 506, then method 500 proceeds to block 512 and sends the stored messages to the ground system via an AOIP link (like Broadband SATCOM, WiFi, or Cell).

Referring to block 504, if a new ACARS message is received, then method 500 proceeds to block 508 and determines whether the new ACARS message is a store and forward type message. If the ACARS message is not a store and forward type message, then method 500 proceeds to block 512 and sends the ACARS message to the ground system (assuming there is sufficient bandwidth to send the message via an AoIP communications link). Alternatively, a store and forward type message can be sent to the ground system if an AoIP communication link is available and there is no pending message. In some embodiments, the ACARS message can be converted into another format to be sent to the ground system via another non-AoIP communications link.

If the new ACARS message is a store and forward type message, then method 500 proceeds to block 510 and stores the ACARS message. In some embodiments, the message is stored based on an order of priority and/or queue order relative to other messages that are stored in the database. In doing so, the AoIP gateway server 110 can send the message that corresponds to the highest priority, oldest in the queue of the stored messages to the ground system when an AoIP communication link is available. Proceeding to block 514, method 500 sends an ACK message back to the CMS. Since the AoIP gateway server has not received an ACK message from ground system for a previously sent ACARS message, the ACK sent at block 514 is a pseudo-ACK that signals to the CMS that the new ACARS message received at block 504 was successfully received at the ground system. This is not actually the case (at least at the time of sending the ACK message), since the new ACARS message was stored at block 510 and will be sent to the ground system once an AoIP communication link is available and there are no higher priority messages remaining.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forma of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and digital video disks (DVDs). Any of the foregoing may be supplemented by, or incorporated in, specially-designed application specific integrated circuits (ASICs).

Example Embodiments

Example 1 includes a method for processing downlink ACARS messages between a communications management system coupled to a vehicle and an ACARS over Internet Protocol (AoIP) gateway server, the method comprising: receiving or generating, at the communications management system, a first ACARS downlink message; forwarding the first ACARS downlink message to a ground system communicatively coupled to the vehicle; wherein the first ACARS downlink message is forwarded via an AoIP communication link; receiving, at the communications management system, a second ACARS downlink message, wherein the second ACARS downlink message is configured for storage in a database of the AoIP gateway server; and sending the second ACARS downlink message to the AoIP gateway server before receiving an indication from the ground system that the first ACARS downlink message has been successfully received.

Example 2 includes the method of Example 1, wherein forwarding the first ACARS downlink message to a ground system further comprises forwarding the first ACARS downlink message via the AoIP communication link to the ground system when the AoIP communication link becomes available and the first ACARS downlink message is a first message in a queue of messages.

Example 3 includes the method of any of Examples 1-2, further comprising: storing the second ACARS downlink message in the database based on a priority associated with the second ACARS downlink message and/or a queue order; sending, by the AoIP gateway server, an acknowledgement response to the communications management system indicating that the second ACARS downlink message has been successfully transmitted; and transmitting, by the AoIP gateway server, the second ACARS downlink message to the ground system when an AoIP communication link to the ground system becomes available.

Example 4 includes the method of any of Examples 1-3, further comprising: sequentially receiving or generating a plurality of ACARS downlink messages; determining, by the communications management system, that at least one ACARS downlink message of the plurality of ACARS downlink messages is a store and forward type message while the first ACARS downlink message is undergoing transmission to the ground system; and sending each of the at least one store and forward ACARS downlink message to the AoIP gateway server before receiving an indication from the ground system that the first ACARS downlink message has been successfully received.

Example 5 includes the method of Example 4, wherein determining that the at least one ACARS downlink message is a store and forward type messages comprises determining a ACARS label/sublabel or an ACARS label of each respective ACARS downlink message and determining that each respective ACARS downlink message is a store and forward type message from the ACARS label or ACARS label/sublabel.

Example 6 includes the method of any of Examples 1-5, further comprising: receiving, at the AoIP gateway server, the second ACARS downlink message; and sending a pseudo-acknowledgement message to the communications management system in response to receiving the second ACARS downlink message, wherein the pseudo-acknowledgement message indicates to the communications management system that the second ACARS downlink message has been successfully transmitted to the ground system.

Example 7 includes the method of any of Examples 1-6, further comprising: sequentially receiving a plurality of ACARS downlink messages, wherein each of the plurality of ACARS downlink messages is a store and forward type message; storing each of the ACARS downlink messages in the database of the AoIP gateway server; and sending, in response to receiving each respective message of the ACARS downlink messages, a respective pseudo-acknowledgement message to the communications management system, wherein the respective pseudo-acknowledgement message indicates that the respective message has been successfully transmitted to the ground system.

Example 8 includes a system comprising: a communications management system (CMS) coupled to a vehicle; and an Aircraft Communications Addressing and Reporting System (ACARS) over Internet Protocol (AoIP) gateway server communicatively coupled to the CMS, wherein the AoIP gateway server includes at least one processor and a storage medium configured to store ACARS downlink messages, wherein the CMS is configured to receive or generate a first ACARS downlink message, wherein the AoIP gateway server is configured to forward the first ACARS downlink message to a ground system communicatively coupled to the vehicle, wherein the first ACARS downlink message is forwarded via an AoIP communication link, wherein the CMS is configured to receive or generate a second ACARS downlink message, wherein the second ACARS downlink message is configured for storage by the AoIP gateway server, and wherein the CMS is configured to send the second ACARS downlink message to the AoIP gateway server before receiving an indication from the ground system that the first ACARS downlink message has been successfully received.

Example 9 includes the system of Example 8, wherein the AoIP gateway server is configured to forward the first ACARS downlink message via the AoIP communication link to the ground system when the AoIP communication link becomes available and the first ACARS downlink message is a first message in a queue of messages.

Example 10 includes the system of any of Examples 8-9, wherein the AoIP gateway server is configured to: store the second ACARS downlink message based on a priority associated with the second ACARS downlink message and/or a queue order; send an acknowledgement response to the communications management system indicating that the second ACARS downlink message has been successfully transmitted; and transmit the second ACARS downlink message to the ground system when an AoIP communication link to the ground system becomes available.

Example 11 includes the system of any of Examples 8-10, wherein the CMS is configured to: sequentially receive or generate a plurality of ACARS downlink messages; determine that at least one ACARS downlink message of the plurality of ACARS downlink messages is a store and forward type message while the first ACARS downlink message is undergoing transmission to the ground system; and send each of the at least one store and forward ACARS downlink message to the AoIP gateway server before receiving an indication from the ground system that the first ACARS downlink message has been successfully received.

Example 12 includes the system of Example 11, wherein the CMS is configured to: determine an ACARS label/sublabel or an ACARS label of each respective ACARS downlink message; and determine that each respective ACARS downlink message is a store and forward type message from the ACARS label or the ACARS label/sublabel.

Example 13 includes the system of any of Examples 8-12, wherein the AoIP gateway server is configured to: sequentially receive a plurality of ACARS downlink messages, wherein each of the plurality of ACARS downlink messages are a store and forward type message; store each of the ACARS downlink messages; and send, in response to receiving each respective message of the ACARS downlink messages, a respective pseudo-acknowledgement message to the CMS, wherein the respective pseudo-acknowledgement message indicates that the respective message has been successfully transmitted to the ground system.

Example 14 includes the system of any of Examples 8-13, wherein the CMS or the AoIP gateway server is configured to receive an acknowledgment message from the ground system, wherein subsequent to receiving the acknowledgment message from the ground system, the CMS or AoIP gateway server is configured to send another ACARS downlink message to the ground system.

Example 15 includes a program product comprising a non-transitory processor-readable medium on which program instructions configured to be executed by at least one processor are embodied, wherein when executed by the at least one processor, the program instructions cause the at least one processor to: receive or generate, at a communications management system, a first ACARS downlink message; forward the first ACARS downlink message to a ground system communicatively coupled to a vehicle;

wherein the first ACARS downlink message is forwarded via an AoIP communication link; receive, at the communications management system, a second ACARS downlink message, wherein the second ACARS downlink message is configured for storage of an AoIP gateway server; and send the second ACARS downlink message to the AoIP gateway server before receiving an indication from the ground system that the first ACARS downlink message has been successfully received.

Example 16 includes the program product of Example 15, wherein forward the first ACARS downlink message to a ground system further comprises forwarding the first ACARS downlink message via the AoIP communication link to the ground system when the AoIP communication link becomes available and the first ACARS downlink message is a first message in a queue of messages.

Example 17 includes the program product of any of Examples 15-16, wherein the program instructions cause the at least one processor to: store the second ACARS downlink message based on a priority associated with the second ACARS downlink message and/or a queue order; send, by the AoIP gateway server, an acknowledgement response to the communications management system indicating that the second ACARS downlink message has been successfully transmitted; and transmit, by the AoIP gateway server, the second ACARS downlink message to the ground system when an AoIP communication link to the ground system becomes available.

Example 18 includes the program product of any of Examples 15-17, wherein the program instructions cause the at least one processor to: sequentially receive or generate a plurality of ACARS downlink messages; determine, by the communications management system, that at least one ACARS downlink message of the plurality of ACARS downlink messages is a store and forward type message while the first ACARS downlink message is undergoing transmission to the ground system; and send each of the at least one store and forward ACARS downlink message to the AoIP gateway server before receiving an indication from the ground system that the first ACARS downlink message has been successfully received.

Example 19 includes the program product of Example 18, wherein the program instructions cause the at least one processor to: receive, at the AoIP gateway server, the second ACARS downlink message; and send a pseudo-acknowledgement message to the communications management system in response to receiving the second ACARS downlink message, wherein the pseudo-acknowledgement message indicates to the communications management system that the second ACARS downlink message has been successfully transmitted to the ground system.

Example 20 includes the program product of any of Examples 15-19, wherein the program instructions cause the at least one processor to: sequentially receive a plurality of ACARS downlink messages; and send a respective pseudo-acknowledgment message to the communications management system in response to receiving one of the plurality of ACARS downlink messages in sequence.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for processing downlink ACARS messages between a communications management system coupled to a vehicle and an ACARS over Internet Protocol (AoIP) gateway server, the method comprising:
   receiving or generating, at the communications management system, a first ACARS downlink message;
   forwarding the first ACARS downlink message to a ground system communicatively coupled to the vehicle; wherein the first ACARS downlink message is forwarded via an AoIP communication link;
   receiving, at the communications management system, a second ACARS downlink message, wherein the second ACARS downlink message is configured for storage in a database of the AoIP gateway server; and
   sending the second ACARS downlink message to the AoIP gateway server before receiving an indication from the ground system that the first ACARS downlink message has been successfully received.

2. The method of claim 1, wherein forwarding the first ACARS downlink message to a ground system further comprises forwarding the first ACARS downlink message via the AoIP communication link to the ground system when the AoIP communication link becomes available.

3. The method of claim 1, further comprising:
   storing the second ACARS downlink message in the database based on a priority associated with the second ACARS downlink message and/or a queue order;
   sending, by the AoIP gateway server, an acknowledgement response to the communications management system indicating that the second ACARS downlink message has been successfully transmitted; and
   transmitting, by the AoIP gateway server, the second ACARS downlink message to the ground system when the AoIP communication link to the ground system becomes available.

4. The method of claim 1, further comprising:
   sequentially receiving or generating a plurality of ACARS downlink messages;
   determining, by the communications management system, that at least one ACARS downlink message of the plurality of ACARS downlink messages is a store and forward type message while the first ACARS downlink message is undergoing transmission to the ground system; and
   sending each of the at least one store and forward type message to the AoIP gateway server before receiving an indication from the ground system that the first ACARS downlink message has been successfully received.

5. The method of claim 4, wherein determining that the at least one ACARS downlink message is a store and forward type message comprises determining a ACARS label/sublabel or an ACARS label of each respective ACARS downlink message and determining that the each respective ACARS downlink message is a store and forward type message from the ACARS label or ACARS label/sublabel.

6. The method of claim 1, further comprising:
   receiving, at the AoIP gateway server, the second ACARS downlink message; and
   sending a pseudo-acknowledgement message to the communications management system in response to receiving the second ACARS downlink message, wherein the pseudo-acknowledgement message indicates to the communications management system that the second ACARS downlink message has been successfully transmitted to the ground system.

7. The method of claim 1, further comprising:
sequentially receiving a plurality of ACARS downlink messages, wherein each of the plurality of ACARS downlink messages is a store and forward type message;
storing each of the ACARS downlink messages in the database of the AoIP gateway server; and
sending, in response to receiving each respective message of the ACARS downlink messages, a respective pseudo-acknowledgement message to the communications management system, wherein the respective pseudo-acknowledgement message indicates that the respective message has been successfully transmitted to the ground system.

8. A system comprising:
a communications management system (CMS) coupled to a vehicle; and
an Aircraft Communications Addressing and Reporting System (ACARS) over Internet Protocol (AoIP) gateway server communicatively coupled to the CMS, wherein the AoIP gateway server includes at least one processor and a storage medium configured to store ACARS downlink messages,
wherein the CMS is configured to receive or generate a first ACARS downlink message,
wherein the AoIP gateway server is configured to forward the first ACARS downlink message to a ground system communicatively coupled to the vehicle, wherein the first ACARS downlink message is forwarded via an AoIP communication link,
wherein the CMS is configured to receive or generate a second ACARS downlink message, wherein the second ACARS downlink message is configured for storage by the AoIP gateway server, and
wherein the CMS is configured to send the second ACARS downlink message to the AoIP gateway server before receiving an indication from the ground system that the first ACARS downlink message has been successfully received.

9. The system of claim 8, wherein the AoIP gateway server is configured to forward the first ACARS downlink message via the AoIP communication link to the ground system when the AoIP communication link becomes available.

10. The system of claim 8, wherein the AoIP gateway server is configured to:
store the second ACARS downlink message based on a priority associated with the second ACARS downlink message and/or a queue order;
send an acknowledgement response to the communications management system indicating that the second ACARS downlink message has been successfully transmitted; and
transmit the second ACARS downlink message to the ground system when the AoIP communication link to the ground system becomes available.

11. The system of claim 8, wherein the CMS is configured to:
sequentially receive or generate a plurality of ACARS downlink messages;
determine that at least one ACARS downlink message of the plurality of ACARS downlink messages is a store and forward type message while the first ACARS downlink message is undergoing transmission to the ground system; and
send each of the at least one store and forward type message to the AoIP gateway server before receiving an indication from the ground system that the first ACARS downlink message has been successfully received.

12. The system of claim 11, wherein the CMS is configured to:
determine an ACARS label/sublabel or an ACARS label of each respective ACARS downlink message; and
determine that the each respective ACARS downlink message is the store and forward type message from the ACARS label or the ACARS label/sublabel.

13. The system of claim 8, wherein the AoIP gateway server is configured to:
sequentially receive a plurality of ACARS downlink messages, wherein each of the plurality of ACARS downlink messages are a store and forward type message;
store each of the ACARS downlink messages; and
send, in response to receiving the each respective ACARS downlink message, a respective pseudo-acknowledgement message to the CMS, wherein the respective pseudo-acknowledgement message indicates that the respective message has been successfully transmitted to the ground system.

14. The system of claim 8, wherein the CMS or the AoIP gateway server is configured to receive an acknowledgment message from the ground system, wherein subsequent to receiving the acknowledgment message from the ground system, the CMS or AoIP gateway server is configured to send another ACARS downlink message to the ground system.

15. A program product comprising a non-transitory processor-readable medium on which program instructions configured to be executed by at least one processor are embodied, wherein when executed by the at least one processor, the program instructions cause the at least one processor to:
receive or generate, at a communications management system, a first ACARS downlink message;
forward the first ACARS downlink message to a ground system communicatively coupled to a vehicle; wherein the first ACARS downlink message is forwarded via an AoIP communication link;
receive, at the communications management system, a second ACARS downlink message, wherein the second ACARS downlink message is configured for storage of an AoIP gateway server; and
send the second ACARS downlink message to the AoIP gateway server before receiving an indication from the ground system that the first ACARS downlink message has been successfully received.

16. The program product of claim 15, wherein forward the first ACARS downlink message to a ground system further comprises forwarding the first ACARS downlink message via the AoIP communication link to the ground system when the AoIP communication link becomes available.

17. The program product of claim 15, wherein the program instructions cause the at least one processor to:
store the second ACARS downlink message based on a priority associated with the second ACARS downlink message and/or a queue order;
send, by the AoIP gateway server, an acknowledgement response to the communications management system indicating that the second ACARS downlink message has been successfully transmitted; and
transmit, by the AoIP gateway server, the second ACARS downlink message to the ground system when the AoIP communication link to the ground system becomes available.

18. The program product of claim 15, wherein the program instructions cause the at least one processor to:
- sequentially receive or generate a plurality of ACARS downlink messages;
- determine, by the communications management system, that at least one ACARS downlink message of the plurality of ACARS downlink messages is a store and forward type message while the first ACARS downlink message is undergoing transmission to the ground system; and
- send each of the at least one store and forward type message to the AoIP gateway server before receiving an indication from the ground system that the first ACARS downlink message has been successfully received.

19. The program product of claim 18, wherein the program instructions cause the at least one processor to:
- receive, at the AoIP gateway server, the second ACARS downlink message; and
- send a pseudo-acknowledgement message to the communications management system in response to receiving the second ACARS downlink message, wherein the pseudo-acknowledgement message indicates to the communications management system that the second ACARS downlink message has been successfully transmitted to the ground system.

20. The program product of claim 15, wherein the program instructions cause the at least one processor to:
- sequentially receive a plurality of ACARS downlink messages; and
- send a respective pseudo-acknowledgment message to the communications management system in response to receiving one of the plurality of ACARS downlink messages in sequence.

* * * * *